US008781227B2

(12) United States Patent
Sun

(10) Patent No.: US 8,781,227 B2
(45) Date of Patent: Jul. 15, 2014

(54) RECOGNITION OF NUMERICAL CHARACTERS IN DIGITAL IMAGES

(75) Inventor: Xiang Sun, Hangzhou (CN)

(73) Assignee: Alibaba Group Holding Limited (KY)

( * ) Notice: Subject to any disclaimer, the term of this patent is extended or adjusted under 35 U.S.C. 154(b) by 424 days.

(21) Appl. No.: 13/199,332

(22) Filed: Aug. 25, 2011

(65) Prior Publication Data
US 2012/0051645 A1  Mar. 1, 2012

(30) Foreign Application Priority Data

Aug. 30, 2010  (CN) .......................... 2010 1 0270456

(51) Int. Cl.
G06K 9/46 (2006.01)
G06K 9/62 (2006.01)

(52) U.S. Cl.
USPC ........................................ 382/177; 382/187

(58) Field of Classification Search
None
See application file for complete search history.

(56) References Cited

U.S. PATENT DOCUMENTS

| 4,742,556 A | 5/1988 | David, Jr. et al. |
| 5,097,517 A | 3/1992 | Holt |
| 5,497,432 A * | 3/1996 | Nishida .......................... 382/178 |
| 7,336,827 B2 | 2/2008 | Geiger et al. |
| 7,480,410 B2 * | 1/2009 | Hashimoto et al. ........... 382/182 |
| 7,724,956 B2 | 5/2010 | Walch |
| 7,756,335 B2 * | 7/2010 | Sternby ......................... 382/186 |
| 2001/0043740 A1 | 11/2001 | Ichikawa et al. |
| 2007/0058856 A1 * | 3/2007 | Boregowda et al. .......... 382/159 |
| 2007/0172132 A1 | 7/2007 | Walch |
| 2009/0110280 A1 | 4/2009 | Fujii et al. |
| 2009/0136136 A1 * | 5/2009 | Mori et al. .................... 382/187 |
| 2010/0189316 A1 | 7/2010 | Walch |
| 2010/0215276 A1 | 8/2010 | Suwa |

* cited by examiner

Primary Examiner — Brian P Werner
(74) Attorney, Agent, or Firm — Van Pelt, Yi & James LLP

(57) ABSTRACT

Recognition of numerical characters is disclosed, including: extracting a subimage from a received image comprising information pertaining to a plurality of numerical characters, wherein the extracted subimage is associated with one of the plurality of numerical characters; and performing recognition based at least in part on a set of topological information associated with the subimage, including: processing the subimage to obtain the set of topological information associated with the subimage; comparing the set of topological information associated with the subimage with a preset set of stored topological information; determining that in the event that the set of topological information associated with the subimage matches the preset set of stored topological information, the subimage is associated with a recognized numerical character associated with the preset set of stored topological information.

14 Claims, 10 Drawing Sheets

RECOGNITION OF NUMERICAL CHARACTERS IN DIGITAL IMAGES

CROSS REFERENCE TO OTHER APPLICATIONS

This application claims priority to People's Republic of China Patent Application No. 201010270456.1 entitled A DIGITAL IMAGE RECOGNITION METHOD, DEVICE, AND A CRAWLER SERVER filed Aug. 30, 2010 which is incorporated herein by reference for all purposes.

FIELD OF THE INVENTION

This present disclosure involves the field of image processing. In particular, it pertains to a technique of digital image recognition.

BACKGROUND OF THE INVENTION

Digital images are desired to be recognized in various contexts. For example, recognition of digital images may need to be employed by web crawlers. Web crawlers (herein sometimes referred to as just "crawlers") collect data to facilitate search engines in performing their searches. A web crawler typically downloads web pages (using a computer) and then extracts and/or recognizes data that is included or hidden within the web pages. The web crawler can arrange the extracted/recognized data into a format that can be accepted/accessed by the search engine to use when building an index. As such, the web crawler's task of extracting and/or recognizing data from a web page is important.

For example, in the context of a vertical search engine (i.e., a search engine that focuses on a particular segment of content, as opposed to all types of content) for businesses, the associated web crawler can extract and/or recognize such information as: "store name," "address," "phone number," "map coordinates," and "reviews." For example, phone numbers (e.g., including company, business, or personal phone numbers) are very important pieces of information in the vertical search because inclusion of accurate phone numbers can greatly contribute to the information quality and effectiveness of a particular business. In this example, even if the extraction and/or recognition of information is complete for the business other than the phone information, the data collected for the business is still deficient because of the lack of accurate phone number information. Another example of a series of numbers that is desired to be recognized can be an ID number that is present in a scanned image (e.g., a scanned image of a ID card).

Continuing with the phone information example, a phone number is generally a string of numerical characters. Sometimes, at a web page, a phone number is presented in the form of an image. This is so that the phone number does not interfere with a user's reading. Also, since the phone number itself is relatively short and takes up only a very small area on a web page, when the phone number is transmitted as a picture, it does not unduly increase network overhead. If information a web crawler needs to obtain, such as phone numbers, is stored as a digital image, then it is useful for the web crawler to include an optical character recognition (OCR) functionality to recognize such (e.g., numerical) information. OCR is a form of mechanical and/or electronic translation of scanned images of text into machine-intelligible text.

OCR is one form of computer pattern recognition and the recognition of only digits (any numerical characters between "0" to "9") is a particular branch of OCR. Typically, the available technologies employ a digit recognition technique that is a differentiation technique. Such a differentiation technique usually implements the following steps: receive image models for individual digits "0"-"9" and separately differentiate an image to be recognized from the individual model images, find the number of different pixels between the image to be recognized and the model image, and the digit that corresponds to the model image with the smallest number of pixels different from the image to be recognized is determined to be the numerical character in the image to be recognized. This method has a good level of accuracy of recognition for images that are not geometrically distorted. However, if the image noise is severe (e.g., the image is noisy even after applying a noise removal technique), the quality of the digit recognition that uses the differentiation technique may be degraded. Also, the differentiation technique may not be as helpful in processing images of digits with geometrical deformations (e.g., images that are warped or are zoomed in).

Another typical method of image recognition includes the use of neural networks. An image recognition technique that includes the use of neural networks typically includes the following general steps: feature extraction is performed on the image to be recognized and/or also a description is made of the features to be recognized, some human-recognized samples are selected to serve as objects for machine learning, and the machine learning technique can output the image mode (e.g., recognition rules or patterns). By applying this machine learned mode with regard to the images to be recognized, the numerical characters can be obtained in the images to be recognized. Utilizing the neural network technique in digital image recognition also involves certain issues. However, the recognition rate of individual numerical characters in the neural network technique is higher than in the differentiation technique (e.g., it can be as high as 96%~98% for individual character recognition using the neural network technique). For example, in practice, China-based landline phone numbers usually consist of at least of 8 digits, and China-based cell phone numbers are generally made up of even more digits. Assuming there is a 96%~98% accuracy for individual characters, the accuracy of image recognition for an 8-digit phone number (such as for a China-based stationary phone) would be approximately 72.1~85.1%, the accuracy of image recognition for an 11-digit phone number (such as for a China-based cell phone), the accuracy of image recognition would be approximately 63.8~80.1%, and the accuracy of image recognition for a 12-digit phone number (such as including the area code with the phone number of a stationary phone) the accuracy would be approximately 61.3~78.5%. In practice, when image recognition accuracy is not high, the recognition results provided by a crawler are very likely to be of poor quality (e.g., includes many incorrectly recognized characters). To achieve better accuracy of image recognition, the neural network model(s) of the recognition program can be repeatedly tweaked and improved. However, repeatedly tweaking the image recognition model can be inefficient.

BRIEF DESCRIPTION OF THE DRAWINGS

Various embodiments of the invention are disclosed in the following detailed description and the accompanying drawings.

DETAILED DESCRIPTION

Figure 1:
FIG. 1 shows an example image of the numerical character of "3."

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The techniques of the present disclosure can be used in a multitude of universal or specialized computer device environments or configuration such as in, for example, personal computers, server computers, handheld devices or portable devices, tablet type devices, multiprocessing devices, a distributed environment including any one or more of the above-mentioned devices or devices, etc.

In some embodiments, the present disclosure can be implemented as computer executable instructions executed by a computer or a program module, for example. Generally, a program module includes the execution of a specific task or the implementation of a specific abstract data type routine, program, object, group, data structure, etc. This present disclosure can also be realized in a distributed computer environment, and in such a distributed computer environments, tasks can be executed by remote processors connected via communication networks. In a distributed computer environment, program modules can be placed in local and remote computer storage media, including storage devices.

Techniques of image recognition are disclosed. In various embodiments, the image recognition is applied in the context of recognizing numerical characters or symbols. The following example introduces an underlying concept of the present application: human visual recognition of numerical characters can recognize a numerical character, such as "3," regardless of the formatting of the character. For example, regardless if "3" appears as 3 (in bold), 3 (written in a larger font) or 3 (italicized), a human eye can determine that what it sees is still a "3." Other slight variations in the character would not necessarily render the character unrecognizable.

FIG. 1 shows an example image of the numerical character of "3." In the example, the 3 black dots represent the vertices of the numerical character "3" that are shared by all variations of the printed "3" and lines between the dots represent the edges between the vertices. Regardless of some variations of the edges between the vertices that may cause the "3" to becomes warped or deformed, the process of human visual recognition can still recognize the numerical character so long as the vertices of the numerical character are present, correctly positioned relative to each other, and correctly connected by the edges. Hence, the vertices and the edges play an important role in the process of numerical character recognition. It is assumed that so long as the vertices and edges between the vertices are available for a numerical character, then that numerical character can be recognized.

Figure 2:
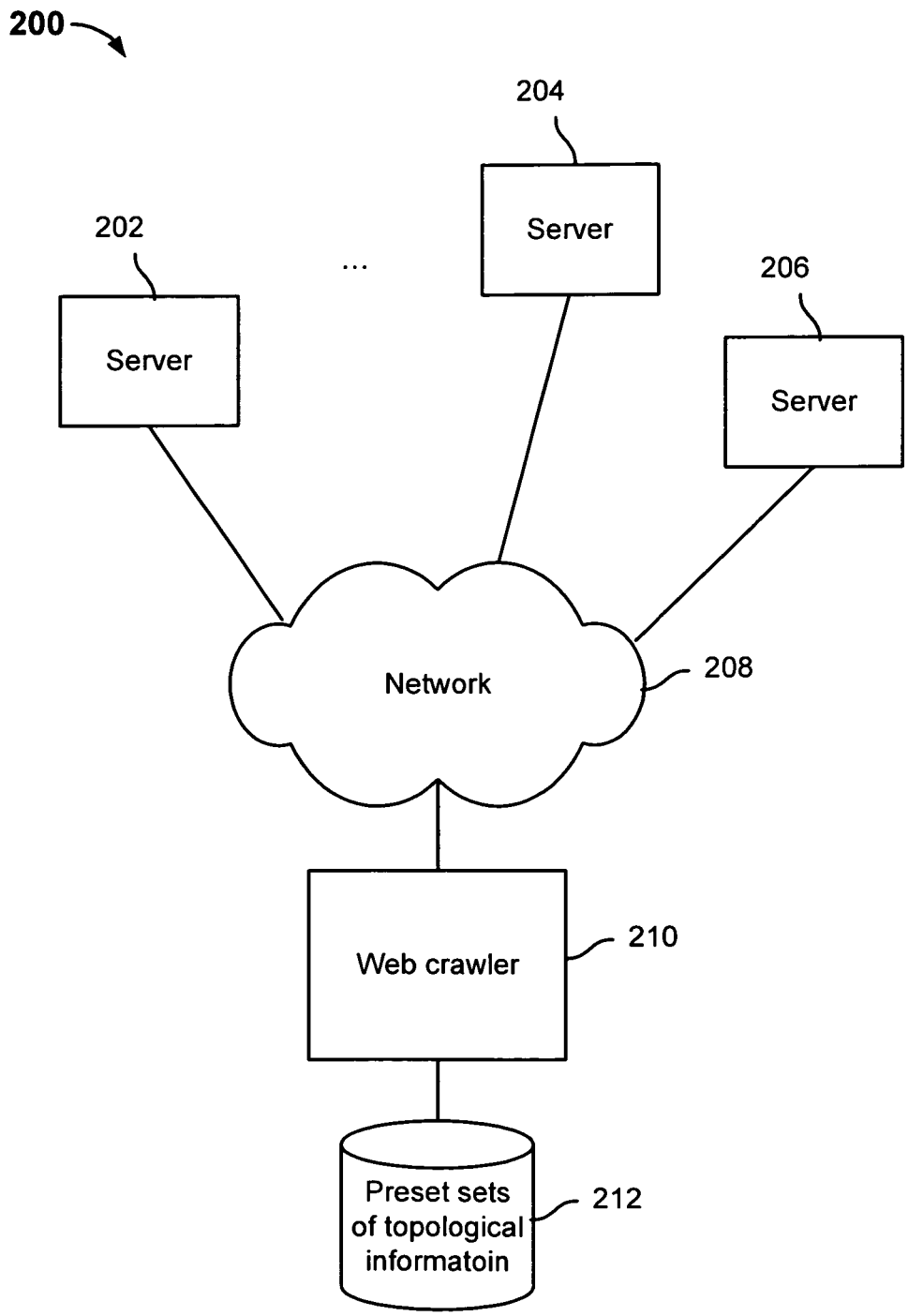
FIG. 2 is a diagram showing an embodiment of a system for numerical character recognition.

FIG. 2 is a diagram showing an embodiment of a system for numerical character recognition. System 200 includes servers 202, 204, 206, network 208, web crawler 210, and preset sets of topological information database 212. Network 208 can include high-speed data and/or telecommunications networks.

Servers 202, 204, and 206 are examples of web servers that host websites that include web pages that web crawler 210 is configured to crawl. Servers 202, 204, and 206 can be operated by third parties.

Web crawler 210 is configured to crawl web pages (e.g., hosted by servers such as 202, 204, and 206). In some embodiments, web crawler 210 can be implemented using one or both of hardware and software. In some embodiments, web crawler 210 is associated with a search engine and/or is a component of a search engine. In various embodiments, web crawler 210 is configured to download content from the web pages for later processing by an associated search engine that will index the downloaded web pages to provide better searches. In some embodiments, web crawler 210 is also configured to extract specific information from the downloaded web pages. For example, web crawler 210 can be configured to extract certain information (e.g., numerical characters) from certain downloaded images. Specifically, certain downloaded images depicting numerical characters (e.g., phone numbers) would be helpful for web crawler 210 to recognize (e.g., for the search engine's indexing or other purposes).

In some embodiments, web crawler 210 is configured to perform recognition of numerical characters on images (e.g., images downloaded from web pages). Web crawler 210 is configured to extract one or more subimages from an image (e.g., an image obtained from a crawled web page). The image can include one or more depictions of numerical characters and each extracted subimage includes a depiction of one numerical character. In some embodiments, web crawler 210 is configured to perform one or more forms of preprocessing (e.g., conversion to grayscale, noise removal) and/or refinement (e.g., image degradation) on the subimages. Web crawler 210 is configured to extract topological information from each of the one or more refined subimages. As used herein, topological information refers to properties of a shape that are preserved despite deformities to the shape. Topological information with respect to a depiction of a numerical character describes properties of the character that are preserved despite any deformation that the character may go through. Topological information can include, for example, the vertices and edges, the degree for each individual vertex, if the vertices and edges form one or more closed rings, and whether two vertices are connected by an edge in the depiction in each subimage. Web crawler 210 is configured to compare the extracted topological information of a subimage against preset sets of topological information stored at database 212. Each preset set of topological information stored at database 212 is associated with a numerical character (e.g., "0" to "9"). If a match is found between the extracted topological information of a subimage and a preset set of topological information, then the depiction in the subimage is determined to be recognized as the numerical character corresponding to the matching preset set of topological information. In some embodiments, if no match is found between the extracted topological information of a subimage and any preset set of topological information, then the extracted topological information is stored (e.g., to be analyzed later).

Figure 3:
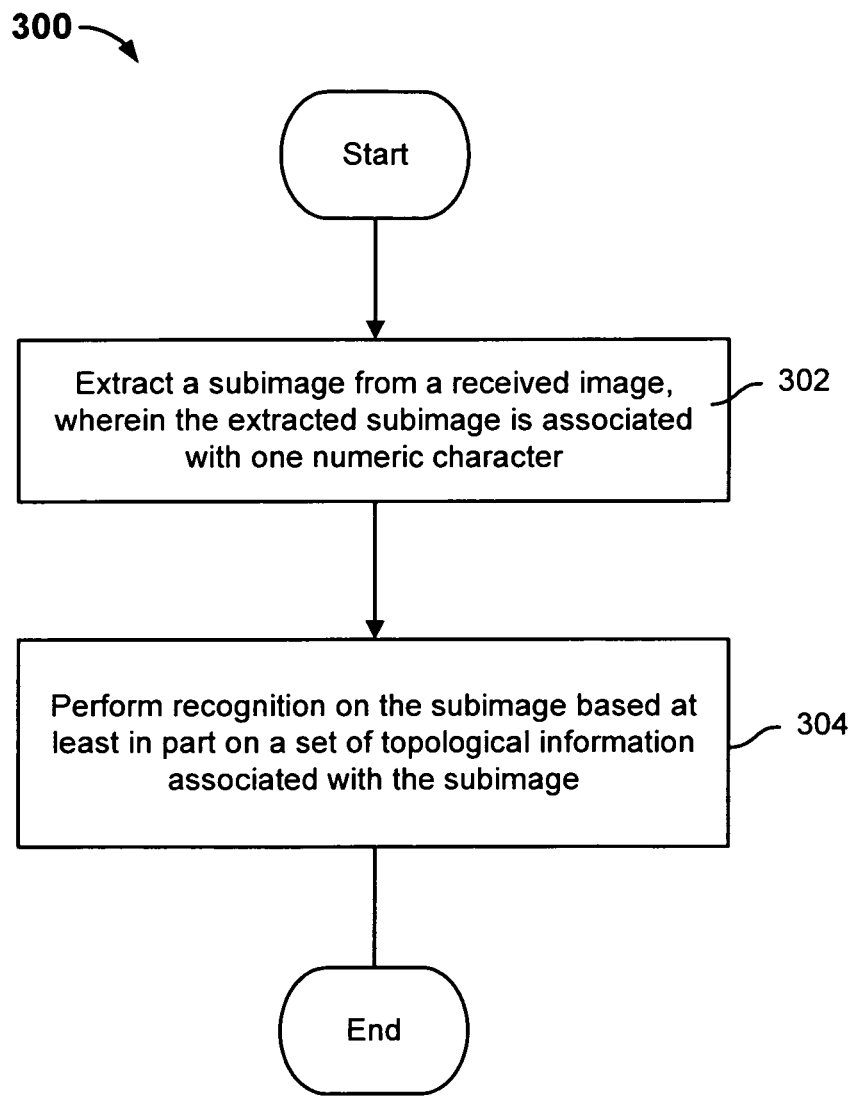
FIG. 3 is a flow diagram showing an embodiment of a process of numerical character recognition.

FIG. 3 is a flow diagram showing an embodiment of a process of numerical character recognition. In various embodiments, process 300 can be applied to recognizing individual numerical characters (e.g., "0" to "9"). In some embodiments, process 300 can be implemented at system 200. In some embodiments, process 300 can be implemented at system 900.

At 302, a subimage is extracted from a received image, wherein the extracted image is associated with one numerical character.

In various embodiments, the received image can be retrieved from a web page crawled by a web crawler. In some embodiments, the received image has already been screened to include one or more numerical characters and those received images that do not include one or more numerical characters are not further processed for numerical character recognition. For example, an image can be screened to determine if it includes a numerical character by analyzing the structure of a web page to extract only images at locations of the web page where it is statistically likely to include images depicting numerical characters. In a received image with one or more numerical characters, each numerical character is depicted as an image to be recognized. For example, an image with multiple numerical characters can be an image of a phone number (e.g., a series of individual numerical characters). As used herein, a subimage refers to an image that is extracted from another image and includes at least a portion of the original image from which it was extracted. The received image can be extracted into as many subimages as there are depictions of numerical characters (i.e., each depiction of a numerical character can be extracted into one subimage). For example, if there were 10 numerical characters depicted in the received image, then 10 corresponding subimages can be extracted from the image. In some embodiments, a depiction of a numerical character is detected if there is enough white space/lack of pixel content on both sides of such a depiction. In some embodiments, the received image can depict characters/symbols other than numerical characters (e.g., parentheses "(" or ")") and each of these characters/symbols can also be extracted into a subimage.

In some embodiments, prior to extracting subimages from the received image, preprocessing is performed on the received image. For example, color differences included in the received image can be removed (e.g., using filters) such that the image includes only the colors of black, white, and/or gray (i.e., the image becomes a monochrome or grayscale image). Also, for example, at least some of the noise in the image can be removed. Noise can refer to image content other than the image content that is helpful to facilitating the recognition of numerical characters, such as redundant pixel information. The purpose of performing preprocessing on the received image is to remove noise and other factors that could potentially degrade the quality of numerical character recognition.

At 304, recognition is performed on the subimage based at least in part on topological information associated with the subimage, including processing the subimage to obtain the set of topological information associated with the subimage, comparing the set of topological information associated with the subimage with a preset set of stored topological information, and determining that in the event that the set of topological information associated with the subimage matches the preset set of stored topological information, the subimage is associated with a recognized numerical character associated with the preset set of stored topological information. If there were more than one subimage extracted at 302, then the recognition process at 304 can be performed for each subimage either in parallel or successively. In some embodiments, 304 is performed by the web crawler.

Figure 4:
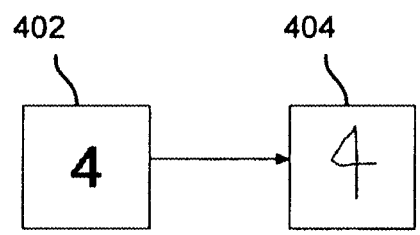
FIG. 4 shows an example of a subimage before and after it has been refined.

In some embodiments, recognition of a subimage includes refining the subimage. As mentioned above, in some embodiments, preprocessing such as noise removal and grayscale conversion have already been performed on the subimage. The preprocessed subimage can be further refined using a conventional technique of image "degradation" from the field of mathematical morphology. The image degradation technique causes the subimage to be converted into an image that has lines that are only one pixel in thickness, while still preserving the continuity in the edges (e.g., lines that connect two vertices) of the original subimage (i.e., all the pixels of the refined subimage include at least one other pixel in its surrounding eight pixels). FIG. 4 shows an example of a subimage before and after it has been refined. In the example, subimage 402 has not been refined and subimage 404 has been refined; subimage 404 is intended to depict a numerical character with lines that are only one pixel in thickness but has the continuity of the edges of the original (not refined) subimage preserved.

Returning to FIG. 3, in some embodiments, after the subimage has been refined, topological information is obtained from the refined subimage. In various embodiments, topological information refers to information regarding the vertices of the depiction of the numerical character in the subimage and the edges between the vertices. A vertex, as used herein and as used in graph theory, refers to the fundamental unit out of which graphs are formed. An edge, as used herein and as used in graph theory, refers to a line segment joining two vertices. In various embodiments, the degree of a vertex refers to the number of edges that extend from the vertex (as used in the graph theory sense). Such topological information is extracted based on the assumption that information regarding vertices and edges thereof is a sufficient basis of data upon which a numerical character can be recognized, despite any warping or deformation to which the depiction of the numerical character has been subject.

In various embodiments, the extracted topological information of the subimage is matched against preset sets of topological information that are stored in a database. The preset sets of topological information are associated with numerical characters from "0" to "9." In some embodiments, a numerical character is associated with one or more preset sets of stored topological information. If a match is determined between a set of topological information gathered from a subimage and a set of stored topological information associated with one of numerical characters "0" to "9," then the depiction of the numerical character in the subimage is determined to be recognized as the numerical character associated with the stored set of topological information. The sets of topological information can be stored in various forms. For example, the relationships between numerical characters and their corresponding preset sets of topological information can be stored in a matrix, table, and/or any other data structure. In some embodiments, an individual numerical character is associated with one preset set of stored topological information. In some embodiments, the topological information is extracted and/or stored in the same format as the format in which the preset topological information is stored so that the extracted information can be matched against the preset topological information to find a match, if one exists. For example, if the preset topological information were stored in a matrix-form, then the extracted topological information is also formatted into a matrix-form so that the two sets of information can be compared.

In some embodiments, when an extracted set of topological information cannot be matched against any stored preset set of topological information, then the extracted set of topological information is stored. In some embodiments, these sets of topological information for which a match cannot be found are stored and reviewed later (e.g., manually by a user to determine whether they are useful). For example, when the stored topological information for which a match was not determined is reviewed and it is determined that the set actually corresponds to a numerical character, then this relationship can be stored in the database.

Figure 5:
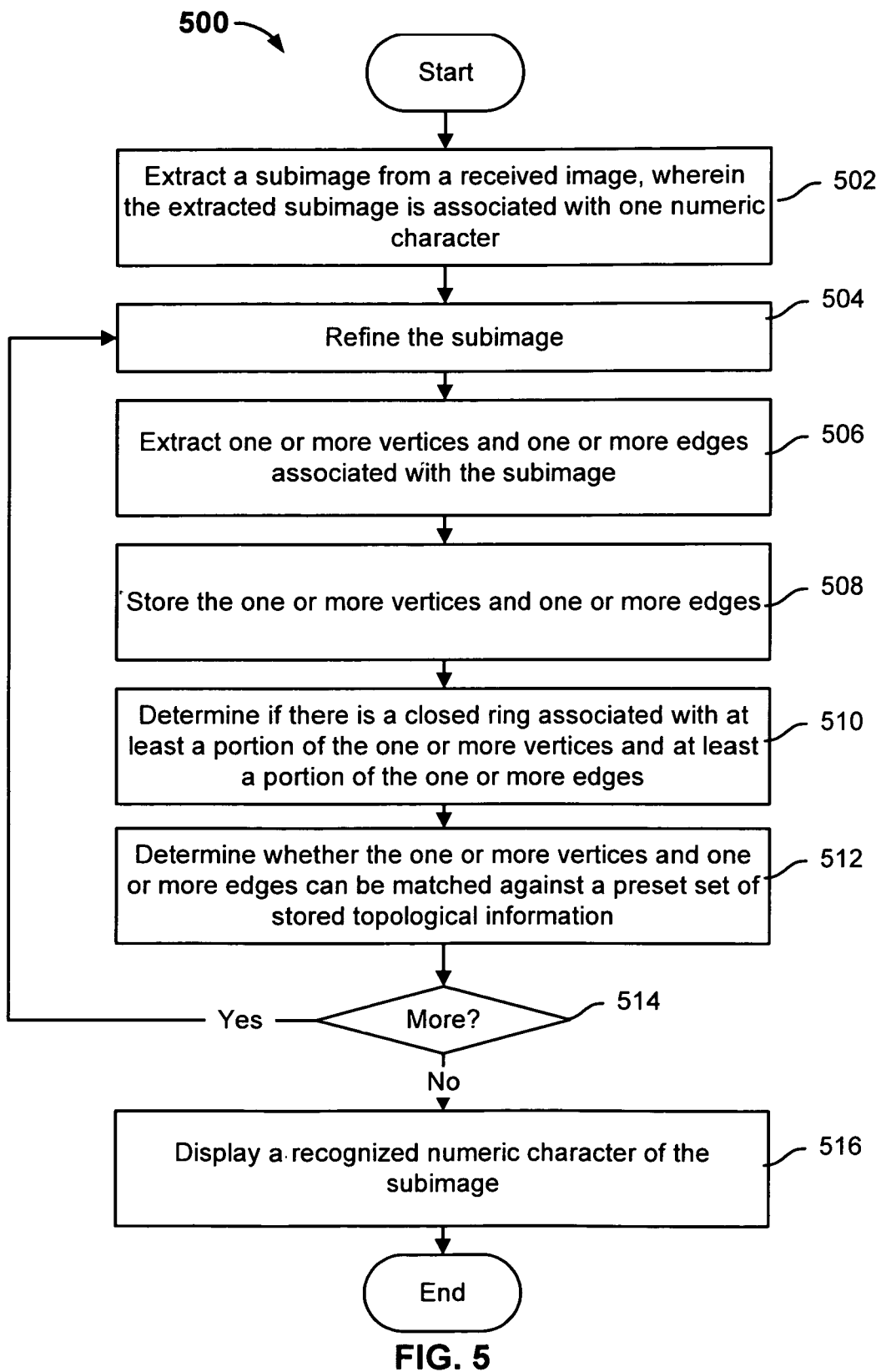
FIG. 5 is a flow diagram showing an embodiment of a process of numerical character recognition.

FIG. 5 is a flow diagram showing an embodiment of a process of numerical character recognition. In some embodiments, process 500 can be implemented at system 200.

At 502, a subimage is extracted from a received image, wherein the extracted subimage is associated with one numerical character. 502 can be described in a manner similar to 302.

At 504, the subimage is refined. In some embodiments, if there are multiple subimages extracted from the received image, then one subimage is randomly selected to be recognized before the others. After recognition is performed on the first selected subimage, then a second subimage can be selected and recognized, and then a third subimage, and so forth, until recognition has been performed on all of the extracted subimages. In some embodiments, if there are multiple subimages, then recognition can be performed on the subimages in parallel. In some embodiments, prior to refining the subimage, preprocessing (e.g., noise removal, conversion to monochrome or grayscale) is performed on the subimage.

In various embodiments, the subimage is refined using mathematical morphology techniques. As a result of refining the subimage, the subimage includes a depiction of a numerical character that is only one pixel in thickness but preserves the continuity of edges from the subimage prior to refinement.

At 506, one or more vertices and one or more edges associated with the subimage are extracted.

Figure 6A:
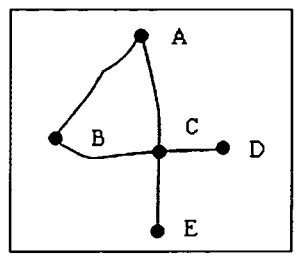
FIG. 6A shows an example of the vertices of a subimage with the depiction of numerical character "4."

The refined subimage is one pixel in thickness and all the pixels include at least one other pixel in its eight surrounding pixels. So, it is possible to traverse the pixels of the subimage to locate each of the vertices of the numerical character depicted in the subimage and also to obtain, based on the manner in which two vertices are related, the degrees of individual vertices. As mentioned before, the degree of a vertex corresponds to the number of edges that extend from the vertex. In some embodiments, the number of vertices and related vertex data associated with a subimage is referred to as the topological information associated with that subimage. FIG. 6A shows an example of the vertices of a subimage with the depiction of numerical character "4." As shown in the example, numerical character "4" has 5 vertices A, B, C, D, and E. The degree of vertex A is 2, the degree of vertex B is 2, the degree of vertex C is 4, the degree of vertex D is 1, and the degree of vertex E is 1. The degrees of the individual vertices of numerical character "4" of FIG. 6 are represented in Table 1.

TABLE 1

| A | B | C | D | E |
|---|---|---|---|---|
| 2 | 2 | 4 | 1 | 1 |

Figure 6B:
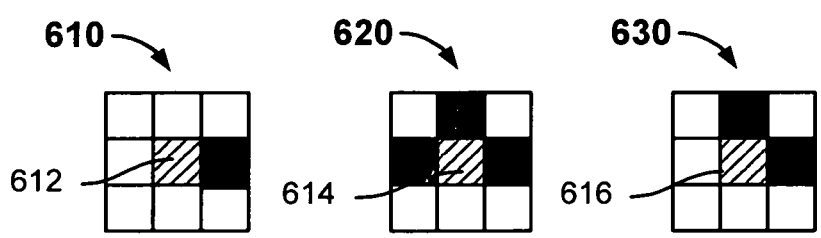
FIG. 6B shows three examples of a center filled in pixel of the subimage and its respective eight surrounding pixels.

In some embodiments, the depiction in the refined subimage is traversed in preset directions, such as from left-to-right and from top-to-bottom to detect vertices and the edges between the vertices. For example, the traversal process can begin from the top-most left filled in pixel of the subimage. Usually, the pixel that is traversed first is a vertex. Then the process continues to the next filled in pixel in a left to right and top to bottom fashion. In some embodiments, during a traversal process, a vertex can be extracted based on a known technique. For example, a vertex can be determined by analyzing the surrounding eight pixels around each filled in pixel of the refined subimage. FIG. 6B shows three examples of a center filled in pixel of the subimage and its respective eight surrounding pixels. 610 shows a 3×3 pixel area where the center pixel, pixel 612 is a filled in pixel of the refined subimage. In other words, 610 shows center pixel 612 and its eight surrounding pixels. 610 shows that center pixel 612 is adjacent to one filled pixel, which indicates that pixel 612 is a vertex (i.e., because there is one filled pixel in one of the eight surrounding pixels). 620 shows center pixel 614 that is a filled in pixel of the refined subimage and where center pixel 614 has three filled in pixels in its eight surrounding pixels. Due to the shown arrangement of the three neighboring filled in pixels (i.e., that are in three directions of directly north, east, south, and west of the center pixel), center pixel 614 is determined to be a vertex. 630 shows that center pixel 616 is a filled in pixel of the refined subimage and where center pixel 616 has two filled in pixels in its eight surrounding pixels. Due to the shown arrangement of the two neighboring filled in pixels (i.e., that are in two directions of directly north, east, south, and west of the center pixel), center pixel 616 is determined to be a vertex. However, techniques of detecting vertices are not limited to only those described herein.

In some embodiments, the degree associated with a vertex is detected after all the vertices are detected. In some embodiments, the degree associated with a vertex is determined just after the vertex is detected. In some embodiments, regardless of how many vertices that a depiction in a refined subimage includes, the technique of detecting vertices and the edges thereof is the same.

Returning to FIG. 5, at 508, the one or more vertices and the one or more edges are stored.

The vertex and the related edge information detected from a subimage are stored (e.g., at a temporary storage). The vertex and the related edge information can be stored in various forms. Information regarding vertices and each of its respective degrees (e.g., Table 1) can be stored. Also, information regarding whether an edge exists between any two vertices can be stored, as shown in the example of Table 2 and explained as follows: whether an edge (e.g., a connection) exists between any two vertices of a subimage can be stored in a matrix/table that includes each vertex in a column and in each row; if an edge exists between two vertices (e.g., A and B), it is indicated by a "1" at the entry at column A and row B (and also column B and row A) and "0" otherwise.

Referring again to FIG. 6, Table 2 below indicates the vertex and related edge information of the numerical character "4." In Table 2, the vertices (A, B, C, D, and E) of the example in FIG. 6 are in both the columns and rows. If a connection/edge exists between two vertices then there is a "1" at an entry associated with those two vertices. If a connection/edge does not exist between two vertices (or if those vertices are the same vertex), then there is a "0" at an entry associated with those two vertices. Specifically, for example, because there is connection/edge between vertices A and B (as can be seen in FIG. 6), there is a "1" at the intersections of column A with row B and also column B with row A. Also, because there is no connection/edge between vertices A and D, there is a "0" at the intersections of column A with row D and also column D with row A.

TABLE 2

|   | A | B | C | D | E |
|---|---|---|---|---|---|
| A | 0 | 1 | 1 | 0 | 0 |
| B | 1 | 0 | 1 | 0 | 0 |
| C | 1 | 1 | 0 | 1 | 1 |
| D | 0 | 0 | 1 | 0 | 0 |
| E | 0 | 0 | 1 | 0 | 0 |

Figure 7:
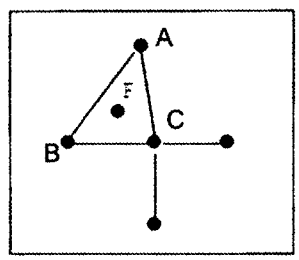
FIG. 7 shows an example image of a numerical character "4" with a central point at the center of a closed ring.

At 510, it is determined if a closed ring is associated with at least a portion of the one or more vertices and at least a portion of the one or more edges. In the event that a closed ring is associated with the subimage, then the position information associated with a central point of the detected ring is stored. In various embodiments, a closed ring refers to when three or more vertices and the edges between those vertices completely enclose an area of the subimage. In some embodiments, the closed ring can be detected using a known technique for determining the presence of a closed ring in a graph of vertices and edges. In one example technique, a closed ring detection technique can start detection at one filled in pixel of the refined image and proceed to a second filled in pixel that is adjacent to the first pixel, and then to a third filled in pixel that is adjacent to the second pixel and so forth. If the detection sequence of filled in pixels returns back to the first filled in pixel, then a closed ring has been determined (i.e., the closed ring is formed by the detected sequence of filled in pixels). In some embodiments, it is kept track of where a detected closed ring is in relation to the other filled in pixels of the refined subimage (e.g., by assigning a sequence number to each filled in pixel of the refined subimage as it is traversed). For example, assuming that the filled in pixels of the subimage is always traversed from left to right and top to bottom, the sequence number of pixel of the closed ring that is first traversed can also be stored. FIG. 7 shows an example image of a numerical character "4" with a central point at the center of a closed ring. In the example, vertices A, B, and C and the edges associated with at least two of the three vertices form a closed ring (e.g., completely enclose an area) and point F is a determined point that is central in the enclosed area. In some embodiments, the central point position is not necessarily within a geometric center of all the vertices or edges associated with the closed ring but is rather some location within the enclosed area. In one example technique, the central point F can be determined by first taking the (x, y) coordinates of the pixels that were detected to form the closed ring and then finding the average x value and the average y value to form the coordinate (i.e., (average x, average y)) of the central point in the closed ring. In another example technique, the central point F can be determined by first determining the maximum x value, minimum x value, maximum y value, and minimum x value of the pixels that were detected to form the closed ring. These four values (maximum x value, minimum x value, maximum y value, and minimum x value) can be used to form a rectangle. The x- and y-coordinate of the center of this rectangle can be taken as the central point of the closed ring (unless this point is verified to not actually be within the enclosed area of the closed ring).

In some embodiments, the central point is stored with the vertex and edge information associated with a subimage (e.g., Table 2). For example, if the central point location of the numerical character of "4" were stored with the vertex and edge information for (e.g., Table 2), then the central point location could be included in an additional entry of the table or at a separate location (e.g., as represented by a coordinate). In some embodiments, if a closed ring is not detected from the subimage, then data associated with "none" would be stored for the entry associated with central point information.

Regardless of how a closed ring and/or a central point of a closed ring are detected, the detection of one or more closed rings and/or the detection of one or more central points are useful in determining whether a set of topological information extracted from a subimage matches a preset set of stored topological information. For example, the numerical character "8" is the only numerical character from "0" to "9" that includes two closed rings and also two central points. So, a set of topological information extracted from a subimage of "8" should match a preset set of stored topological information corresponding to "8," which should be the only preset sets of stored topological information that include information regarding two closed rings and/or two central points. Also, both numerical characters "6" and "9" each include one closed ring and one central point. But, assuming that the filled in pixels of the refined subimage is always from left to right and top to bottom, the set of topological information extracted from the subimage will reflect whether the closed ring was detected earlier in the traversal process (e.g., for a subimage depicting the numerical character of "9") or relatively later in the traversal process (e.g., for a subimage depicting the numerical character of "6") to distinguish between matching the preset set of stored topological information corresponding with "6" or "9."

In some embodiments, 510 is optional and may be omitted.

At 512, it is determined whether the one or more vertices and the one or more edges associated with the subimage can be matched against a preset set of stored topological information; in the event there is a match, it is determined that the subimage is recognized as a numerical character corresponding to the matching preset set of stored topological information.

In various embodiments, relationships between preset sets of topological information and their corresponding numerical characters (i.e., "0," "1," "2," "3," "4," "5," "6," "7," "8," or "9") are stored, for example, in a database. In some embodiments, a numerical character can be associated with one or more preset sets of stored topological information. In various embodiments, a stored set of topological information corresponding to a numerical character includes at least vertex information (including the degree associated with each vertex), edge information, the relationships (e.g., whether an edge exists between two vertices) between the vertices of the numerical character, and, in some embodiments, also information regarding one or more central points. In some embodiments, each set of topological information is stored in one or more matrices or tables, such as Tables 1 and 2, as mentioned above.

In some embodiments, the vertex and related edge information extracted from the subimage are converted to the same format as a preset set of topological information that is stored in the database (if it is not already in the same format). In some embodiments, the vertex and related edge information is converted to (if it is not already in the form) of Tables 1 and 2, as explained above. As explained above, Table 1 includes information regarding the vertices of the subimage and each of its respective degrees and Table 2 includes information regarding whether an edge exists between any two vertices of the depiction in the subimage.

In some embodiments, a portion of the vertex and related edge information extracted from the subimage can be compared to a corresponding portion of a preset set of topological information stored in the database at a time, and if there is a match, then another portion of the extracted information is compared to another corresponding portion of the preset set of topological information and so forth, until all portions have been compared. If all portions of the extracted information match all corresponding portions of the preset set of stored information, then the depiction of the subimage is determined to be recognized as the numerical character associated with that matching preset set of stored topological information. If there is no match between a portion of the extracted information and a corresponding portion of the preset set of information, then the extracted information is compared against another preset set of topological information stored in the database.

For example, information regarding the vertices and each of its respective degrees of the data extracted from the subimage can be compared to the corresponding information of a preset set of topological information stored in the database. Specifically, in some embodiments, the order of the extracted vertices (e.g., the order in which the vertices were detected during the traversal process) are also compared to the order the vertices of the set of stored information to ensure the accurate order of the vertices of the subimage. If there is a match, then the next comparison can be made between information regarding whether an edge exists between any two vertices of the data extracted from the subimage and the corresponding information of the preset set of topological information. If there is match, then the third comparison can be made between central point(s) extracted from the subimage and corresponding information of the preset set of topological information stored in the database. If there is a match, then it is determined that the depiction of the subimage is recognized as the numerical character associated with the preset set of topological information for which the matches were found.

At 514, it is determined if there are more extracted subimages on which recognition is to be performed. In the event that there are subimages that were extracted from the received image for which recognition has not have been performed, control passes to 502 to process the next unprocessed subimage. However, if recognition has been performed for all the subimages, then control passes to 516. Although, in some embodiments, instead of processing each subimage in a series (e.g., one after another), each subimage can be processed in parallel.

At 516, a recognized numerical character of the subimage is displayed. In some embodiments, when there are multiple subimages on which the recognition process has been successfully applied, the recognized numerical characters of the subimages are displayed (e.g., at a screen for a user that is testing out the recognition process) in the left to right (and top to bottom, if there were multiple rows of numerical characters that were recognized) order in which the subimages were extracted. For example, if the received image was an image that contained a phone number (which is read from left to right), then it would be helpful to display the recognized numerical characters of the phone number in the same left to right order in which each subimage of the phone number image was extracted.

Figure 8:
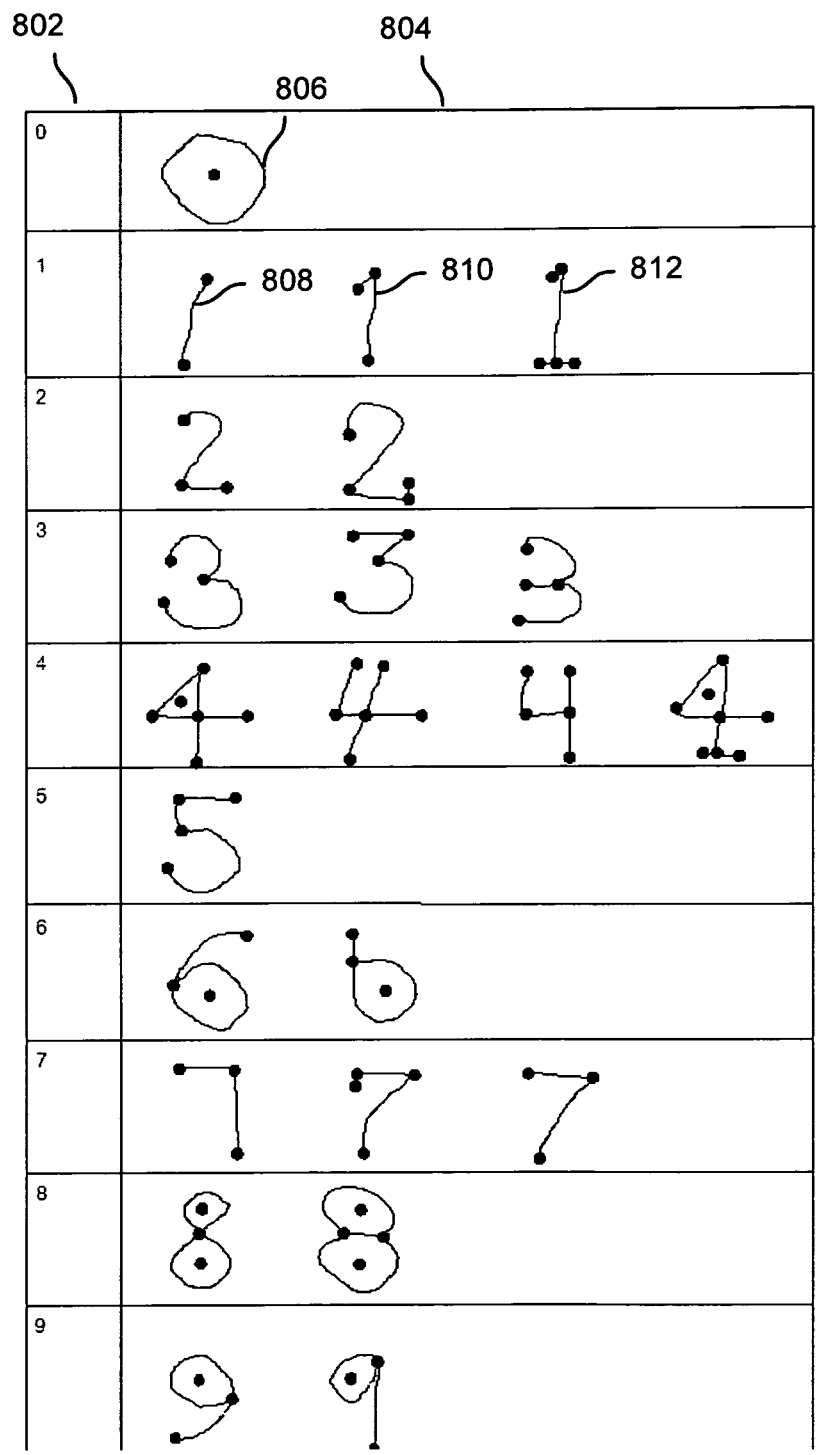
FIG. 8 shows an example of one form in which preset sets of topological information and their corresponding numerical characters can be stored in the database.

FIG. 8 shows an example of one form in which preset sets of topological information and their corresponding numerical characters can be stored in the database. As shown in the example, column 802 includes numerical characters ("0," "1," "2," "3," "4," "5," "6," "7," "8," and "9") and column 804 includes corresponding visual representation more preset sets of topological information. In the example, numerical character "0" corresponds to one preset set of topological information, 806. While 806 is shown as a visual representation (similar to depictions of refined subimages), the same topological information of 806 (i.e., zero vertices, zero edges, one central point) can also be stored in matrices/tables in the database, in some embodiments. In the example, numerical character "1" corresponds to three preset sets of topological information 808, 810, and 812. Also, while 808, 810, and 812 are shown as visual representations, the same topological information of 808 (i.e., two vertices, one edge, zero central points), 810 (i.e., three vertices, two edges, zero central points), and 812 (i.e., five vertices, four edges, and zero central points) can also be stored in matrices/tables in the database, in some embodiments.

Figure 9:
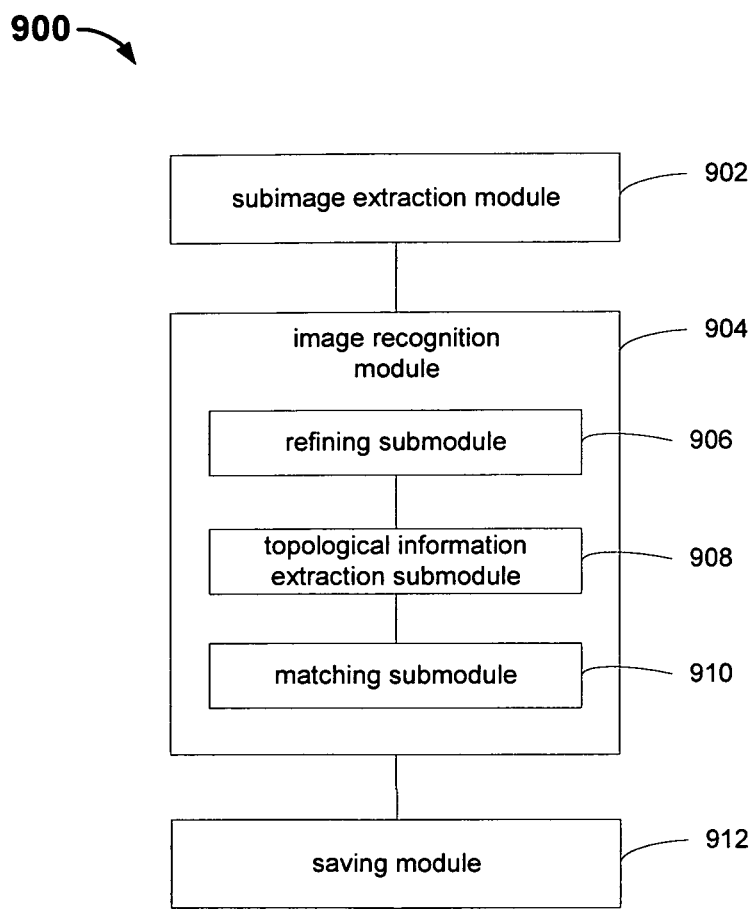
FIG. 9 shows a diagram of an embodiment of a system for processing numerical character recognition.

FIG. 9 shows a diagram of an embodiment of a system for processing numerical character recognition. In some embodiments, process 300 can be implemented at system 900. In some embodiments, system 900 is implemented in association with a web crawler (e.g., so that the web crawler could better recognize numerical characters as it crawls through images that include depictions of numbers on various embodiments). In some embodiments, system 900 is a component of a web crawler.

The modules and submodules can be implemented as software components executing on one or more processors, as hardware such as programmable logic devices and/or Application Specific Integrated Circuits designed to perform certain functions or a combination thereof. In some embodiments, the modules and submodules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules and submodules may be implemented on a single device or distributed across multiple devices.

Subimage extraction module 902 is configured to extract a subimage from a received image. Each subimage is associated with one numerical character (or in other words, a depiction of a numerical character) from "0" to "9." In some embodiments, more than one subimage can be extracted.

Image recognition module 904 is configured to perform numerical character recognition processing on each of the one or more extracted subimages based at least on topological information of each subimage. Image recognition module 904 includes:

Refining submodule 906, which is configured to refine the one or more subimages. For example, refining submodule 906 can refine a subimage using mathematical morphology techniques to convert the depiction in the subimage to be one pixel in thickness.

Topological information extraction submodule 908, which is configured to extract topological information from the one or more subimages.

Matching submodule 910, which is configured to match the extracted topological information of each subimage against the preset sets of topological information associated with numerical characters stored in a database. If a match is found between the extracted topological information from a subimage and a preset set of stored topological information, then it is determined that the depiction in the subimage is recognized to be the numerical character that is associated with the preset set of stored topological information.

In some embodiments, system 900 includes saving module 912, which is configured to store the extracted topological information if it cannot be matched against any preset set of topological information that is stored in the database.

Figure 10:
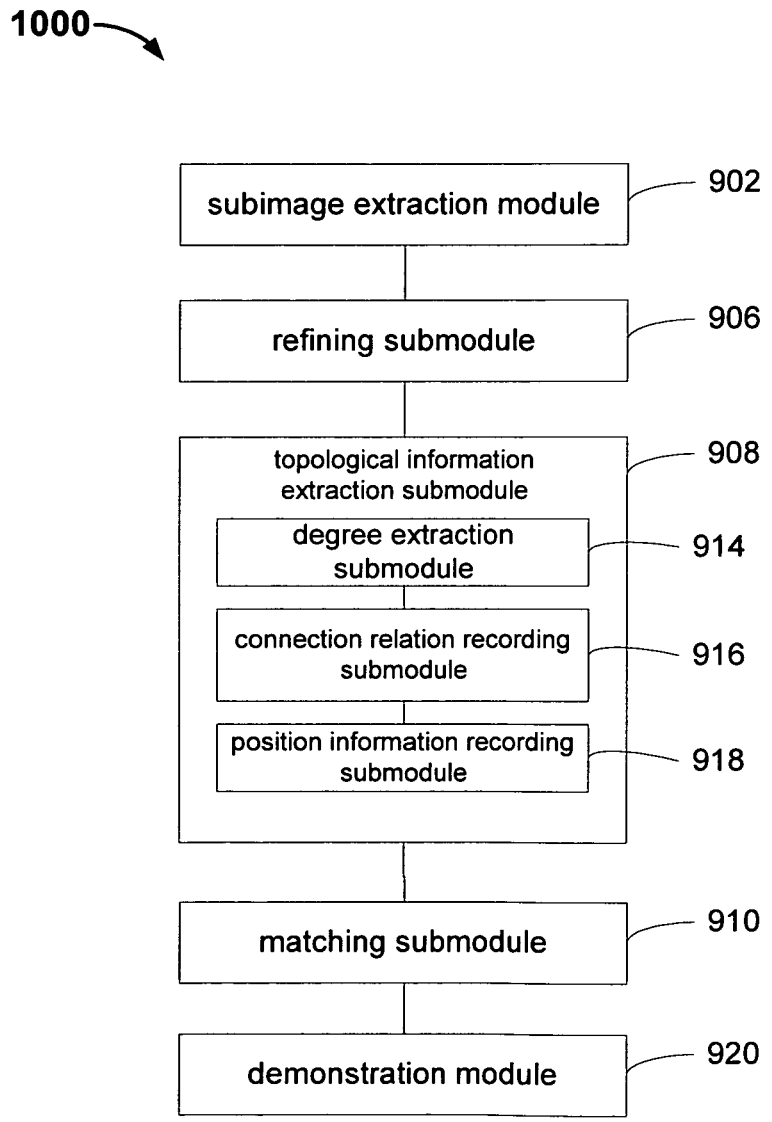
FIG. 10 is a diagram showing an embodiment of a system for processing numerical character recognition.

FIG. 10 is a diagram showing an embodiment of a system for processing numerical character recognition. In some embodiments, process 500 can be implemented at system 1000. In some embodiments, system 1000 is implemented in association with a web crawler. In some embodiments, system 1000 is a component of a web crawler.

System 1000 includes certain submodules (subimage extraction submodule 902, refining submodule 906, topological information extraction submodule 908 and matching submodule 910) that were also present in system 900 and will not be described again.

Degree extraction submodule 914 is configured to extract the one or more vertices and also the one or more edges of a refined subimage.

Connection relation recording submodule 916 is configured to store (e.g., in a temporary storage) the extracted vertex and related edge information including information regarding the connections between the vertices of the subimage (e.g., whether there is an edge present between two vertices).

Position information recording submodule 918 is configured to determine whether there is a closed ring in a subimage and if so, to record a position of a central point of a detected closed ring.

Demonstration module 920 is configured to present the numerical characters recognized from the one or more subimages at a display. In some embodiments, the recognized numerical characters are displayed from left to right and top to bottom, in the same order in which the corresponding subimages were extracted.

It must be explained that the individual embodiments in this Specification have been described using an incremental method, and whatever is emphasized in the explanation of each embodiment are the differences from the other embodiments, and the shared and similar parts of individual embodiments can be included by reference. Certain descriptions of embodiments of system can be supplemented with the descriptions of the method embodiments.

Finally, it must be explained that the terms "include," "contain" or any other variants thereof are aimed at covering non-exclusive inclusion, hence, such that, a process, method, system or device that includes a number of essential modules, not only includes those modules but also includes other essential modules that were not explicitly listed; or includes essential modules that are inherent to this process, method, system, or device. In the absence of other restrictions, essential modules qualified by the phrase "including one . . . " do not preclude the existence of other identical essential modules within the above-mentioned process, method, system, or device.

Above, we have provided a description of the method of digital numerical character recognition, system, and crawler server offered by this present disclosure; specific examples were used in the text in order to elaborate on the principle and realization method of this present disclosure. The explanation of the above embodiments is only for assistance in understanding the method of this present disclosure and its core concepts. At the same time, according to the concept of this present disclosure, regular technical experts in the field may make modifications to specific modes of realization and utilization scope; to summarize the above, this specification contents must not be understood to limit this present disclosure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
extract a subimage from a received image comprising information pertaining to a plurality of numerical characters, wherein the extracted subimage is associated with one of the plurality of numerical characters;
perform recognition based at least in part on a set of topological information associated with the subimage, including:
process the subimage to obtain the set of topological information associated with the subimage, wherein the processing of the subimage includes:
obtain the set of topological information by extracting one or more vertices and one or more edges associated with the subimage; and
determine whether a closed ring associated with at least a portion of the one or more vertices and at least a portion of the one or more edges exists, wherein the determining whether the closed ring exists comprises:
proceed from a first filled in pixel to a second filled in pixel, the second filled in pixel being adjacent to the first filled in pixel;
proceed from the second filled in pixel to a third filled in pixel repeatedly until the first filled in pixel is reached, the third filled in pixel being adjacent to the second filled in pixel; and
in the event that the first filled in pixel is reached:
associate a point within the closed ring as representing the closed ring; and
add a location of the point representing the closed ring to the set of topological information;
compare the set of topological information associated with the subimage with a preset set of stored topological information;
determine that in the event that the set of topological information associated with the subimage matches the preset set of stored topological information, the subimage is associated with a recognized numerical character associated with the preset set of stored topological information; and a memory coupled to the processor and configured to provide the processor with instructions.

2. The system of claim 1, wherein the processor is further configured to refine the subimage.

3. The system of claim 2, wherein to refine the subimage includes to apply image degradation to the subimage.

4. The system of claim 1, wherein the preset set of stored topological information is stored in a database.

5. The system of claim 1, wherein the processor is further configured to display the recognized numerical character.

6. The system of claim 1, wherein the recognized numerical character is one of the following: 0, 1, 2, 3, 4, 5, 6, 7, 8, or 9.

7. A method, comprising:

extracting a subimage from a received image comprising information pertaining to a plurality of numerical characters, wherein the extracted subimage is associated with one of the plurality of numerical characters; and performing recognition based at least in part on a set of topological information associated with the subimage, including:

processing the subimage to obtain the set of topological information associated with the subimage, wherein the processing of the subimage includes:

obtaining the set of topological information by extracting one or more vertices and one or more edges associated with the subimage; and determining whether a closed ring associated with at least a portion of the one or more vertices and at least a portion of the one or more edges exists, wherein the determining whether the closed ring exists comprises:

proceeding from a first filled in pixel to a second filled in pixel, the second filled in pixel being adjacent to the first filled in pixel;

proceeding from the second filled in pixel to a third filled in pixel repeatedly until the first filled in pixel is reached, the third filled in pixel being adjacent to the second filled in pixel; and in the event that the first filled in pixel is reached:
associating a point within the closed ring as representing the closed ring; and
adding a location of the point representing the closed ring to the set of topological information;

comparing the set of topological information associated with the subimage with a preset set of stored topological information;

determining that in the event that the set of topological information associated with the subimage matches the preset set of stored topological information, the subimage is associated with a recognized numerical character associated with the preset set of stored topological information.

8. The method of claim 7, further comprising refining the subimage.

9. The method of claim 8, wherein refining the subimage includes applying image degradation to the subimage.

10. The method of claim 7, wherein the preset set of stored topological information is stored in a database.

11. The method of claim 7, further comprising displaying the recognized numerical character.

12. The method of claim 7, wherein the recognized numerical character is one of the following: 0, 1, 2, 3, 4, 5, 6, 7, 8, or 9.

13. A computer program product, the computer program product being embodied in a tangible non-transitory computer readable storage medium and comprising computer instructions for:

extracting a subimage from a received image comprising information pertaining to a plurality of numerical characters, wherein the extracted subimage is associated with one of the plurality of numerical characters; and performing recognition based at least in part on a set of topological information associated with the subimage, including:

processing the subimage to obtain the set of topological information associated with the subimage, wherein the processing of the subimage includes:

obtaining the set of topological information by extracting one or more vertices and one or more edges associated with the subimage; and determining whether a closed ring associated with at least a portion of the one or more vertices and at least a portion of the one or more edges exists, wherein the determining whether the closed ring exists comprises:

proceeding from a first filled in pixel to a second filled in pixel, the second filled in pixel being adjacent to the first filled in pixel;

proceeding from the second filled in pixel to a third filled in pixel repeatedly until the first filled in pixel is reached, the third filled in pixel being adjacent to the second filled in pixel; and in the event that the first filled in pixel is reached:
associating a point within the closed ring as representing the closed ring; and
adding a location of the point representing the closed ring to the set of topological information;

comparing the set of topological information associated with the subimage with a preset set of stored topological information;

determining that in the event that the set of topological information associated with the subimage matches the preset set of stored topological information, the subimage is associated with a recognized numerical character associated with the preset set of stored topological information.

14. The system of claim 1, wherein the point within the determined closed ring is a central point of the closed ring.

* * * * *